UNITED STATES PATENT OFFICE.

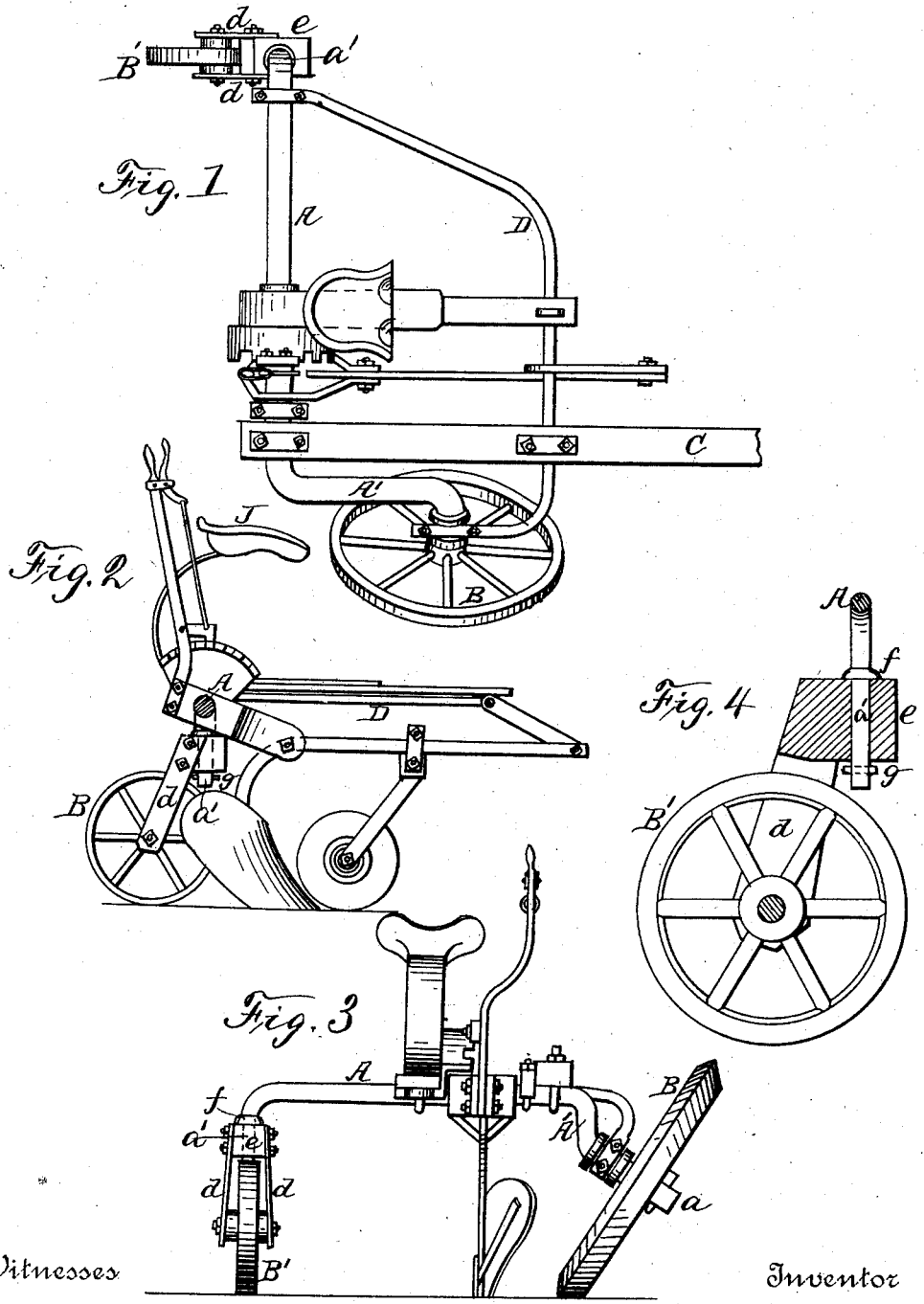

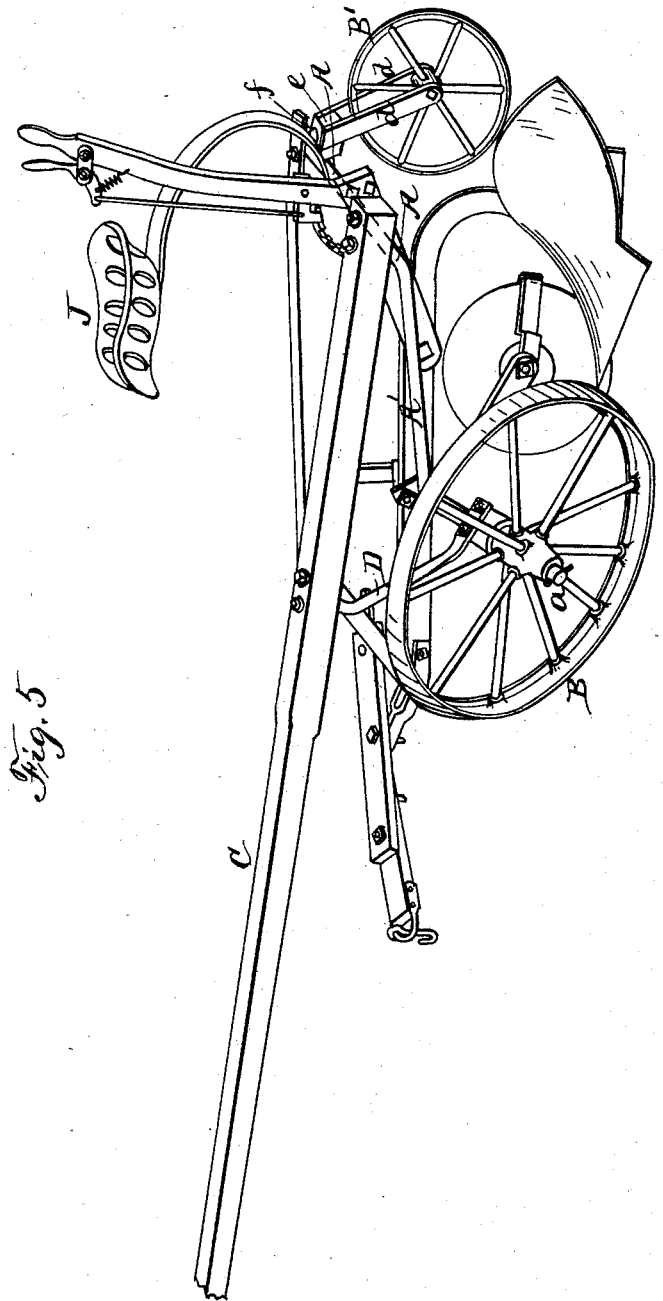

MILTON T. HANCOCK, OF LITTLE ROCK, ARKANSAS, ASSIGNOR TO THE HANCOCK PLOW COMPANY, OF SAME PLACE.

WHEEL-PLOW.

SPECIFICATION forming part of Letters Patent No. 374,152, dated November 29, 1887.

Application filed August 13, 1887. Serial No. 246,830. (No model.)

*To all whom it may concern:*

Be it known that I, MILTON T. HANCOCK, a citizen of the United States, residing at Little Rock, in the county of Pulaski and State of Arkansas, have invented new and useful Improvements in Wheeled Plows, of which the following is a specification.

My invention relates to that class of plows in which the frame is mounted upon two wheels; and my invention particularly consists in the provision of a caster or swivel wheel at the left end of the frame or axle, whereby the plow is caused to be turned at the end of the land without bringing the left wheel into the furrow, and thus avoid having to back the plow to free it of the furrow at the turning-point. This caster-wheel is preferably mounted upon the left end of the axle, and by reason of its swiveling function will follow its lead and will turn easy and quickly and leave the right-hand wheel free to control the plow, taking off all side draft. I prefer to use this swivel-wheel with a furrow-wheel inclined at an angle to the horizontal upward and outward from the ground, whereby it runs regularly in the furrow and regulates the width of the cut of the plow; but the furrow-wheel may have a bearing on a horizontal arm of the axle; nor is my invention confined to the particular construction of axle or frame shown, but may be used with any suitable axle or frame and with the right wheel arranged in any suitable relation to the left caster-wheel, so long as the latter acts as stated.

Referring to the drawings, Figure 1 represents a top view of a sulky-plow embracing my improvement. Fig. 2 is a side sectional view of the same. Fig. 3 is a rear view of the same. Fig. 4 shows in detail view the caster-wheel attached to the vertical left end of the axle. Fig. 5 shows the machine in perspective.

The axle A, which I prefer to use, is of peculiar form, having its right end portion bent forward parallel with the tongue and forms a crank or L-shaped arm, A', standing to the front and obliquely downward, so as to form a journal-bearing, $a$, for the right supporting-wheel B. The other end of the axle terminates in a vertical journal-bearing arm, $a'$, standing downward for a caster or swivel wheel, B'. These several bends of the axle have different relations to the middle part, A, and the axle-arm A' is of such a length as to throw the left wheel about twelve inches behind the right one, for the purpose of causing the plow to be turned at the end of the land without bringing the left wheel into the furrow. I prefer this construction because the frontward-standing axle-arm is conveniently terminated in a downward-bent oblique journal-bearing for the oblique furrow-wheel, and because the axle and a front-bent brace, D, form the frame for the tongue C, the driver's seat J, and the plow attachments, which may be constructed and arranged as shown or in any suitable manner.

As stated, the left end of axle is bent vertically downward, and is thus made to form the stem or bearing $a'$ for the caster or swivel wheel, which is of a size suited for the furrow-wheel. For this purpose the carrying-arms $d\ d$ of the swivel-wheel are secured to a metal block, $e$, through a vertical opening in which the vertical axle-arm $a'$ passes and is secured by a bearing-shoulder, $f$, at the top of the block, and by a pin or key, $g$, at the bottom of said block, and thus lock the axle to the caster-frame at a point above the wheel. This gives a strong and durable construction of caster-wheel-axle attachment, the arrangement of which, in connection with furrow-wheel, allows the latter to easily control the machine, permits it to be easily and quickly turned, and in every way betters the running of the machine and its handling by the driver.

The furrow and the caster wheels in their relation shown give every advantage in handling the machine, and the form of the axle is well adapted for an inclined furrow-wheel and a left hand caster-wheel. In such relation a single axle is adapted for carrying the furrow-wheel in front thereof at one end and a caster-wheel in the rear at the other end of the axle, while a front brace connects with each end of the axle and completes the frame for supporting any suitable arrangement of plow appliances. Such an arrangement of carrying-wheels of the character described gives the advantage of placing the driver's seat so as to balance the machine.

I claim—

1. The carrying and supporting frame of a wheeled plow, consisting of an axle having a forward-extending crank-arm at its right end and a vertical arm at its left end, a front brace connecting with the axle, and a rigid tongue, in combination with the right or furrow wheel and a left caster-wheel mounted upon said vertical axle-arm, substantially as described, for the purpose specified.

2. The axle of a wheeled plow, having at one end the frontward-extending arm A', terminating in a downward oblique journal-bearing, $a$, its opposite end terminating in a downward-extending bearing-arm, $a'$, in combination with an oblique furrow-wheel upon the bearing-arm $a$, and a caster-wheel mounted upon said vertical bearing-arm $a'$, substantially as described, for the purpose specified.

3. The axle of a wheeled plow having its furrow end extended longitudinally forward and thence outward and downward, terminating in an oblique wheel-spindle and having its left or land end formed with an inverted caster-shank for a caster-wheel adapted to swivel beneath said axle, for the purpose stated.

4. The axle, the inclined furrow-wheel, and the caster-wheel, the said wheels being mounted on the opposite ends of the axle, one working in front of the latter and the other swiveled upon the end of the axle, in combination with a rigid tongue and a driver's seat arranged in front of said axle, as shown and described.

MILTON T. HANCOCK.

Witnesses:
N. P. DOOK,
D. A. CHAMBERS.